US010222598B2

(12) United States Patent
Kitahara et al.

(10) Patent No.: US 10,222,598 B2
(45) Date of Patent: Mar. 5, 2019

(54) INVERTED MICROSCOPE AND LIGHT BLOCKING DEVICE FOR INVERTED MICROSCOPE

(71) Applicant: OLYMPUS CORPORATION, Hachioji-shi, Tokyo (JP)

(72) Inventors: Akihiro Kitahara, Hino (JP); Shintaro Kobayashi, Hachioji (JP)

(73) Assignee: OLYMPUS CORPORATION, Tokyo (JP)

( * ) Notice: Subject to any disclaimer, the term of this patent is extended or adjusted under 35 U.S.C. 154(b) by 88 days.

(21) Appl. No.: 15/270,768

(22) Filed: Sep. 20, 2016

(65) Prior Publication Data

US 2017/0090173 A1 Mar. 30, 2017

(30) Foreign Application Priority Data

Sep. 24, 2015 (JP) ................. 2015-186695

(51) Int. Cl.
*G02B 21/00* (2006.01)
*G02B 21/16* (2006.01)
(Continued)

(52) U.S. Cl.
CPC ......... *G02B 21/0088* (2013.01); *G02B 5/005* (2013.01); *G02B 21/16* (2013.01);
(Continued)

(58) Field of Classification Search
CPC ............... G02B 21/00; G02B 21/0028; G02B 21/0032; G02B 21/06; G02B 21/0088;
(Continued)

(56) References Cited

U.S. PATENT DOCUMENTS 4,972,258 A * 11/1990 Wolf .................... G02B 21/002
250/458.1
7,253,575 B2 * 8/2007 Belgum ................. G02B 26/02
318/468
(Continued)

FOREIGN PATENT DOCUMENTS

JP 2003185932 A 7/2003

OTHER PUBLICATIONS

Smartshutter, Technical information Flyer, Shutter Instrument Co., 2012.*

*Primary Examiner* — Marin Pichler
(74) *Attorney, Agent, or Firm* — Holtz, Holtz & Volek PC

(57) ABSTRACT

An inverted microscope includes: an epifluorescence illumination optical system configured to irradiate a specimen on a stage with epi-illumination light from below the stage; a transmitting illumination optical system configured to irradiate the specimen on the stage with transmitting illumination light from above the stage; an objective lens arranged below the stage and configured to collect the epi-illumination light on the specimen; and a light blocking unit configured to be arranged between the stage and the transmitting illumination optical system so as to be located on or deviated from an observation optical axis of the inverted microscope, and configured to be located at a light blocking position separated from the stage so as to block all direct light entering the objective lens at an angle not larger than an aperture angle of the objective lens.

12 Claims, 13 Drawing Sheets

(51) Int. Cl.
   *G02B 5/00*           (2006.01)
   *G02B 21/24*          (2006.01)
   *G02B 21/02*          (2006.01)
   *G02B 21/08*          (2006.01)

(52) U.S. Cl.
   CPC ............ *G02B 21/24* (2013.01); *G02B 21/025* (2013.01); *G02B 21/088* (2013.01)

(58) Field of Classification Search
   CPC .... G02B 21/0076; G02B 21/14; G02B 21/16; G02B 21/0052; G02B 21/0064; G02B 21/02; G02B 21/025; G02B 21/088; G02B 5/005
   USPC .......................... 359/380, 381, 379, 391–394
   See application file for complete search history.

(56) References Cited

U.S. PATENT DOCUMENTS

2013/0176618 A1*   7/2013   Hayashi ............... G02B 21/088
                                                            359/385
2014/0233095 A1*   8/2014   Lee ........................ G02B 21/06
                                                            359/385
2015/0278625 A1*   10/2015   Finkbeiner ............. G02B 21/26
                                                            348/79

\* cited by examiner

INVERTED MICROSCOPE AND LIGHT BLOCKING DEVICE FOR INVERTED MICROSCOPE

CROSS REFERENCES TO RELATED APPLICATIONS

This application is based upon and claims the benefit of priority from Japanese Patent Application No. 2015-186695, filed on Sep. 24, 2015, the entire contents of which are incorporated herein by reference.

BACKGROUND

1. Technical Field

The disclosure relates to an inverted microscope and a light blocking device for an inverted microscope.

2. Related Art

Conventionally, a fluorescence microscope has been known which irradiates a specimen with excitation light from an epifluorescence illumination optical system by using an objective lens to observe a fluorescent image of the specimen. When the specimen is irradiated with the excitation light, a substance forming the specimen is excited to emit fluorescence having a longer wavelength than that of the excitation light. The fluorescence microscope forms an image of the fluorescence by using the objective lens and the like to observe.

Herein, since the fluorescence is weak light, it is preferable that ambient light other than the fluorescence (for example, indoor lighting) does not enter the objective lens in order to improve an SN ratio of the fluorescent image. For example, in JP 2003-185932 A, the ambient light is blocked by a lid covering an entire specimen on a stage.

SUMMARY

In some embodiments, an inverted microscope includes: an epifluorescence illumination optical system configured to irradiate a specimen on a stage with epi-illumination light from below the stage; a transmitting illumination optical system configured to irradiate the specimen on the stage with transmitting illumination light from above the stage; an objective lens arranged below the stage and configured to collect the epi-illumination light on the specimen; and a light blocking unit configured to be arranged between the stage and the transmitting illumination optical system so as to be located on or deviated from an observation optical axis of the inverted microscope, and configured to be located at a light blocking position separated from the stage so as to block all direct light entering the objective lens at an angle not larger than an aperture angle of the objective lens.

In some embodiments, a light blocking device for an inverted microscope is provided. The light blocking device is configured to be attached to the inverted microscope. The inverted microscope includes: an epifluorescence illumination optical system configured to irradiate a specimen on a stage with epi-illumination light from below the stage; a transmitting illumination optical system configured to irradiate the specimen on the stage with transmitting illumination light from above the stage; and an objective lens arranged below the stage and configured to collect the epi-illumination light on the specimen. The light blocking device includes a light blocking unit configured to be arranged between the stage and the transmitting illumination optical system so as to be located on or deviated from an observation optical axis of the inverted microscope, and configured to be located light blocking position separated from the stage so as to block all direct light entering the objective lens at an angle not larger than an aperture angle of the objective lens.

In some embodiments, an inverted microscope includes: an epifluorescence illumination optical system configured to irradiate a specimen on a stage with epi-illumination light from below the stage; a transmitting illumination optical system configured to irradiate the specimen on the stage with transmitting illumination light from above the stage, by a white LED having a fluorescent body; an objective lens arranged below the stage and configured to collect the epi-illumination light on the specimen; a light blocking unit that: is configured to be arranged between the stage and the transmitting illumination optical system so as to be located on or deviated from an observation optical axis of the inverted microscope; has a plate-shaped principal surface and is configured to be arranged such that the principal surface is orthogonal to the observation optical axis of the inverted microscope; and is movable between a light blocking position and a retracted position, the light blocking position being separated from the stage so as to block all direct light entering the objective lens at an angle not larger than an aperture angle of the objective lens, the retracted position being an position where the light blocking unit as a whole is retracted away from an area in which the transmitting illumination light emitted from the transmitting illumination optical system passes; and a positioning unit configured to position the light blocking unit at the light blocking position and configured to position the light blocking unit at the retracted position. The inverted microscope satisfies $$R \geq r + s \cdot \tan \theta$$

where R represents a maximum distance between the observation optical axis and an end face of the light blocking unit when the light blocking unit is located at the light blocking position, θ represents the aperture angle of the objective lens, r represents an aperture radius of the objective lens, and s represents a distance in a direction along the observation optical axis of the inverted microscope between the light blocking unit at the light blocking position and the objective lens.

The above and other features, advantages and technical and industrial significance of this invention will be better understood by reading the following detailed description of presently preferred embodiments of the invention, when considered in connection with the accompanying drawings.

DETAILED DESCRIPTION

Figure 1:
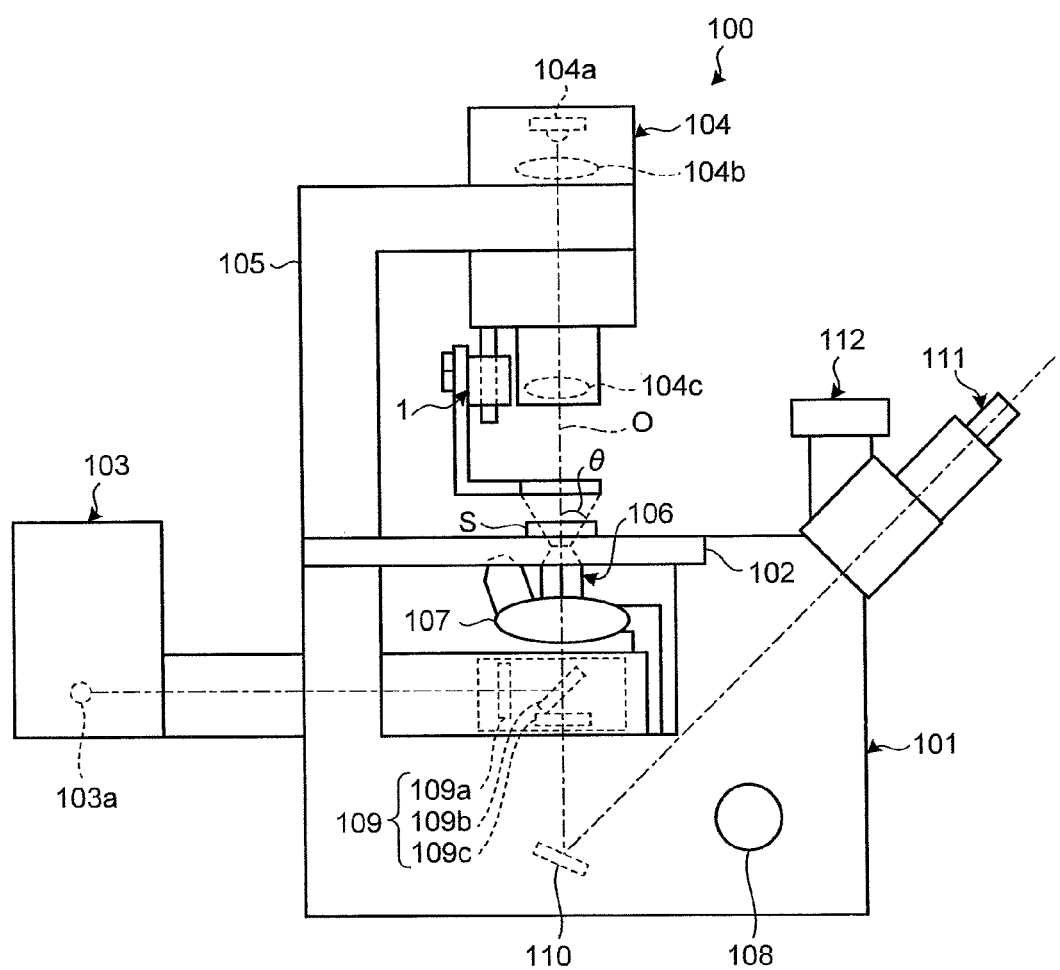
FIG. 1 is a schematic diagram illustrating a configuration of an inverted microscope according to a first embodiment of the present invention.

Exemplary embodiments of an inverted microscope and a light blocking device for an inverted microscope according to the present invention will be hereinafter described with reference to the drawings. The present invention is not limited by the embodiments. The present invention is generally applicable to an inverted microscope having an epifluorescence illumination optical system and a transmitting illumination optical system for performing fluorescence observation, and also applicable to a light blocking device for the inverted microscope.

The same reference numerals are used to designate the same elements throughout the drawings. The drawings are schematic, so that it is noted that dimensional relationship among respective elements and a ratio of the respective elements might be different from actual ones. The dimensional relationship and the ratio might be different among the drawings.

First Embodiment

FIG. 1 is a schematic diagram illustrating a configuration of an inverted microscope according to a first embodiment of the present invention. As illustrated in FIG. 1, a microscope 100 being the inverted microscope according to the first embodiment is provided with a microscope main body 101 serving as a base of the microscope 100, a stage 102 on which a specimen S is put, a first light source unit 103 being an epifluorescence illumination optical system which irradiates the specimen S on the stage 102 with epi-illumination light from below the stage 102, a second light source unit 104 being a transmitting illumination optical system which irradiates the specimen S on the stage 102 with transmitting illumination light from above the stage 102, an arm 105 which holds the second light source unit 104, a plurality of objective lenses 106 with different magnifications that is arranged below the stage 102 and is configured to collect the epi-illumination light on the specimen S, a revolver 107 which holds a plurality of objective lenses 106 so as to be exchangeable with respect to the specimen S, a focusing handle 108 which moves the objective lenses 106 and the revolver 107 upward and downward, a mirror unit 109 which switches an optical path of the epi-illumination light and light reflected by the specimen S or transmitted through the specimen S, a mirror 110 which reflects the light from the mirror unit 109 in a predetermined direction, an eyepiece unit 111 for visually observing the specimen and an imaging unit 112 for imaging the specimen S. Each optical element of the microscope 100 is arranged at an appropriate position for observing the specimen S along an observation optical axis O of the microscope 100.

A mechanical stage (not illustrated) is mounted on the stage 102 and the specimen S on the mechanical stage can be positioned.

The first light source unit 103 includes a light source 103a.

The second light source unit 104 includes a light source 104a, a collector lens 104b configured to convert light from the light source 104a into substantially parallel light, and a condenser lens 104c configured to collect the substantially parallel light from the collector lens 104b on the specimen S.

The light source 104a includes a solid-state light emitting element configured to emit excitation light and a fluorescent body configured to emit fluorescence by the excitation light emitted from the solid-state light emitting element. When the solid-state light emitting element emits the excitation light, mixed light of the excitation light and the fluorescence emitted from the fluorescent body is emitted from the light source 104a. The light source 104a being a white LED (light emitting diode), for example, includes the solid-state light emitting element being a single-color LED chip and the fluorescent body irradiated with the excitation light from the single-color LED chip to emit white fluorescence.

The mirror unit 109 being a fluorescent mirror unit including an excitation filter 109a, a dichroic mirror 109b, and a barrier filter 109c, for example, can be exchanged with another mirror unit as required. The excitation filter 109a extracts light corresponding to an excitation wavelength from emission light emitted from the light source 103a. The dichroic mirror 109b reflects light of a predetermined wavelength out of the light emitted from the light source 103a and transmits light of a predetermined wavelength out of the light emitted from the specimen S. The barrier filter 109c further extracts light of a predetermined wavelength from the light transmitted through the dichroic mirror 109b out of the light emitted by the specimen S.

Next, reference will be made in detail to a light blocking device 1 which is a light blocking device for an inverted microscope according to the first embodiment. As illustrated in FIG. 1, the light blocking device 1 is arranged between the stage 102 and the second light source unit 104.

Figure 2:
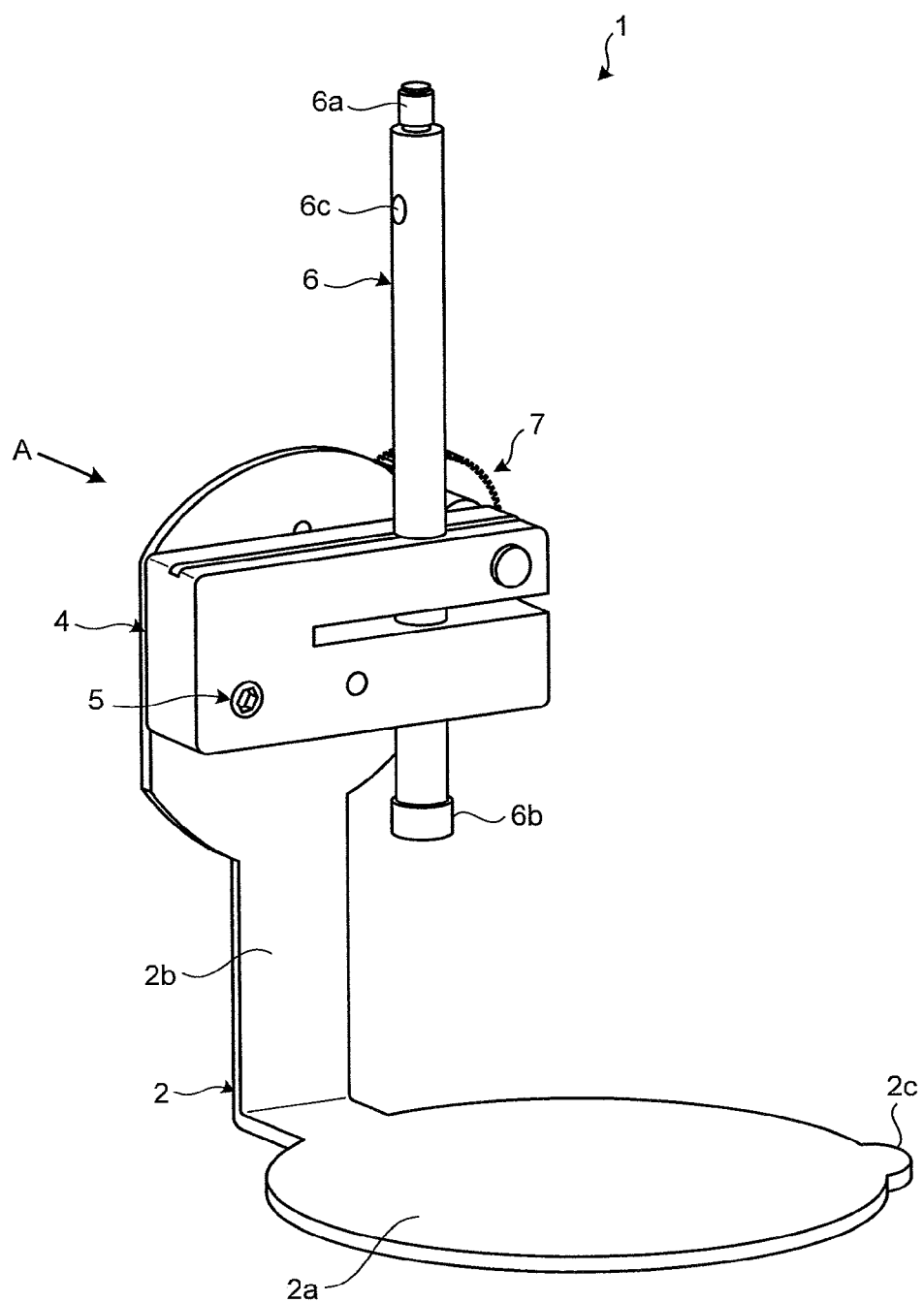
FIG. 2 is an enlarged view of a light blocking device illustrated in FIG. 1.
Figure 3:
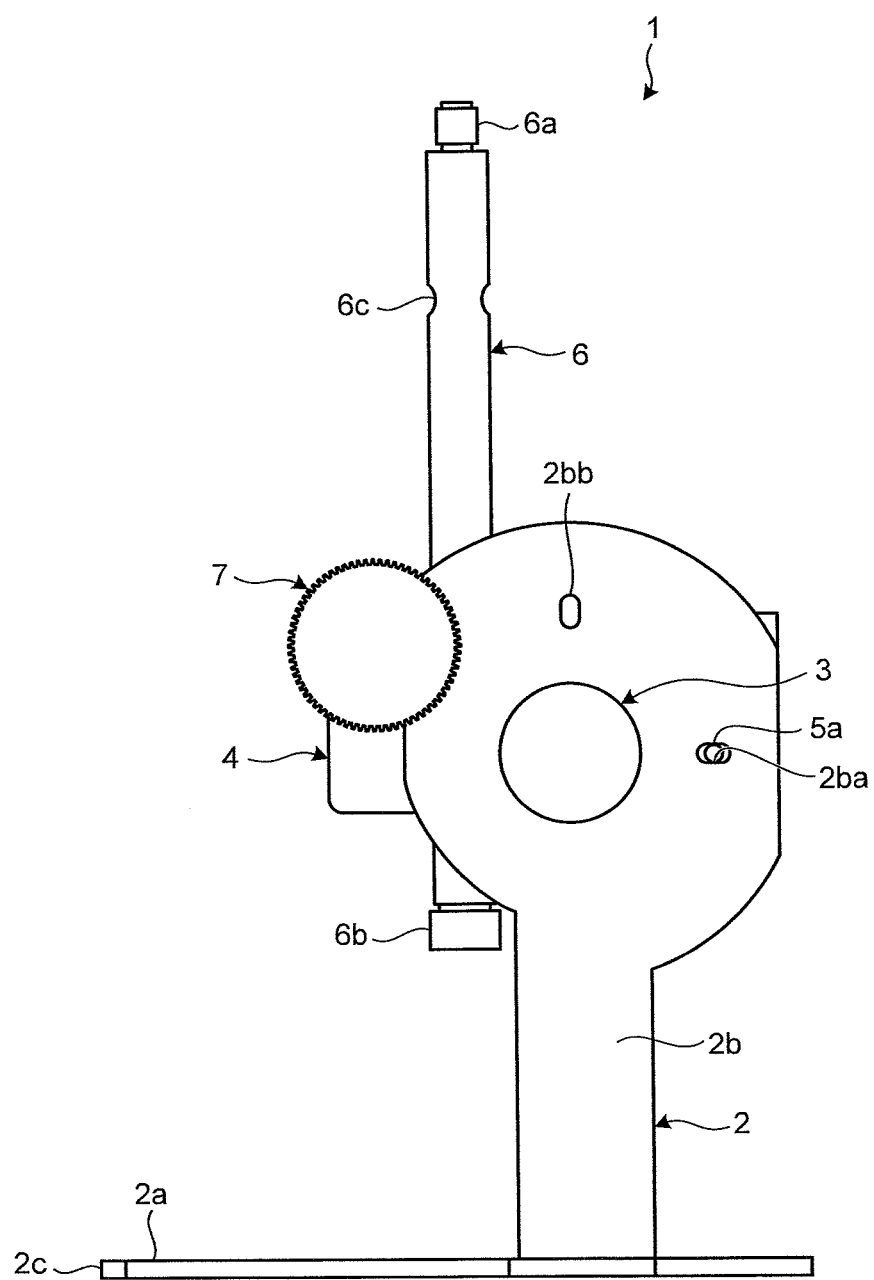
FIG. 3 is a schematic view taken in the direction of an arrow A in FIG. 2.

FIG. 2 is an enlarged view of the light blocking device illustrated in FIG. 1. FIG. 3 is a schematic view taken in the direction of an arrow A in FIG. 2. The light blocking device 1 is provided with a light blocking plate 2 having a disk shape arranged such that a principal surface of the disk is orthogonal to the observation optical axis O of the microscope 100, a shaft 3 which rotatably holds the light blocking plate 2, a holder 4 which holds the shaft 3, a ball plunger 5 attached so as to penetrate the holder 4, a guide 6 which holds the holder 4 so as to be movable along the observation optical axis O of the microscope 100, the guide 6 fixed to a lower portion of the second light source unit 104 of the microscope 100, and a knob 7 which fixes the holder 4 to the guide 6. The light blocking plate 2 of the light blocking device 1 is arranged so as to be located on or deviated from the observation optical axis O of the microscope 100 as described later.

Figure 4:
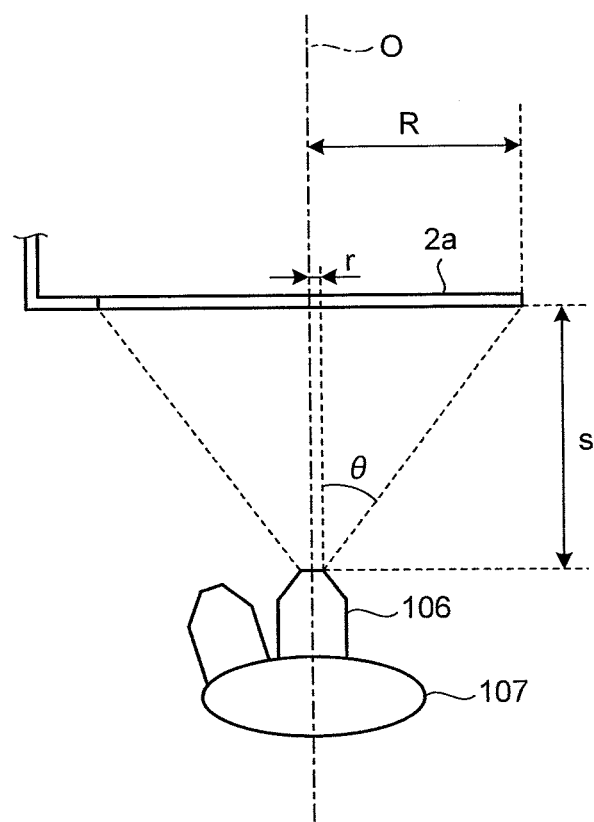
FIG. 4 is an exemplary illustration of a relationship between an objective lens and a size of a light blocking unit.

The light blocking plate 2 includes a disk-shaped light blocking unit 2a arranged so as to be orthogonal to the observation optical axis O of the microscope 100, an arm unit 2b extending from a side of the light blocking unit 2a in a direction orthogonal to the light blocking unit 2a, and a projection 2c serving as a grip when locating the light blocking plate 2 on the observation optical axis O and deviating the light blocking plate 2 from the observation optical axis O, which will be described later. Furthermore, click grooves 2*ba* and 2*bb* for positioning the light blocking plate 2 are formed on the arm unit 2*b*. FIG. 4 is an exemplary illustration of a relationship between the objective lens and a size of the light blocking unit. As illustrated in FIG. 4, a radius R of the light blocking unit 2*a* satisfies R≥r+s·tan θ where θ represents an aperture angle of the objective lens 106, r represents an aperture radius of the objective lens 106, and s represents a distance in a direction along the observation optical axis O of the microscope 100 between the light blocking unit 2*a* and the objective lens 106. FIG. 4 illustrates a state in which R=r+s·tan θ is satisfied; it is sufficient that the radius R of the light blocking unit 2*a* is made larger than the radius R illustrated in FIG. 4. In this manner, the light blocking unit 2*a* can be located at a light blocking position to block all direct light entering the objective lens 106 at an angle not larger than the aperture angle θ of the objective lens 106 (that is to say, the light which goes straight to directly enter the objective lens 106 except diffracted light). The aperture angle θ is an angle of the light entering from an outermost side out of the direct light entering the objective lens 106. The click grooves 2*ba* and 2*bb* are formed with an angle of 90 degrees therebetween around the shaft 3.

The shaft 3 is attached to the holder 4 to hold the light blocking plate 2 so as to be rotatable.

The holder 4 can be fixed to the guide 6 and is movable in the direction along the observation optical axis O of the microscope 100 along the guide 6.

In the ball plunger 5, a spring (not illustrated) accommodated therein biases a ball 5*a* arranged on an end (front side of the sheet in FIG. 3) to allow the ball 5*a* to project from the holder 4. The ball 5*a* is fit in the click groove 2*ba* or 2*bb* to position the light blocking plate 2 and adds a sense of clicking at the time of operation.

The guide 6 having a bar shape includes a screw 6*a* provided on one end, a stopper 6*b* provided on the other end, and a hole 6*c* which penetrates the guide 6 in a direction orthogonal to a longitudinal direction thereof. The screw 6*a* is screwed into a screw hole (not illustrated) provided on a lower portion of the second light source unit 104 of the microscope 100. At that time, it is possible to tighten the screw 6*a* tightly into the second light source unit 104 of the microscope 100 by inserting a bar-shaped member into the hole 6*c* to rotate the guide 6. The stopper 6*b* prevents the holder 4 from dropping out of the guide 6.

The knob 7 is attached to the holder 4; when the knob 7 is tightened, the holder 4 is fixed to the guide 6. On the other hand, when the knob 7 is loosed, a portion including the holder 4 becomes movable along the guide 6. The light blocking unit 2*a* of the light blocking plate 2 blocks all the direct light entering the objective lens 106 at the angle not larger than the aperture angle θ of the objective lens 106 in at least a part of a range within which the light blocking unit 2*a* can move.

Next, reference will be made to operation to retract the light blocking unit 2*a* of the light blocking device 1 from the observation optical axis O of the microscope 100. First, in FIGS. 2 and 3, the light blocking unit 2*a* is located at the light blocking position to block all the direct light entering the objective lens 106 at the angle not larger than the aperture angle θ of the objective lens 106. In the light blocking position, the ball 5*a* of the ball plunger 5 is fit in the click groove 2*ba* of the light blocking plate 2.

Figure 5:
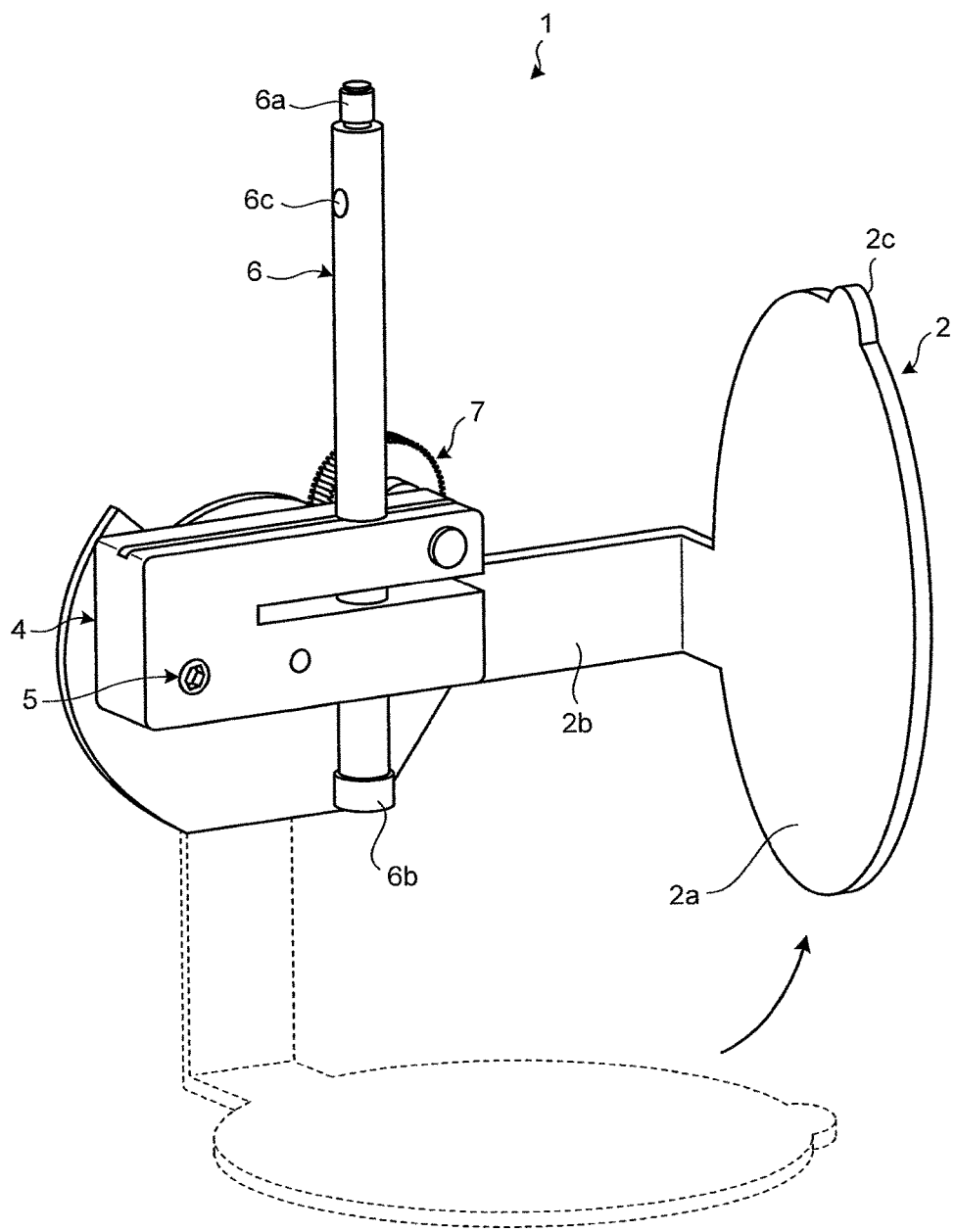
FIG. 5 is a schematic view when a light blocking plate is rotated in FIG. 2.
Figure 6:
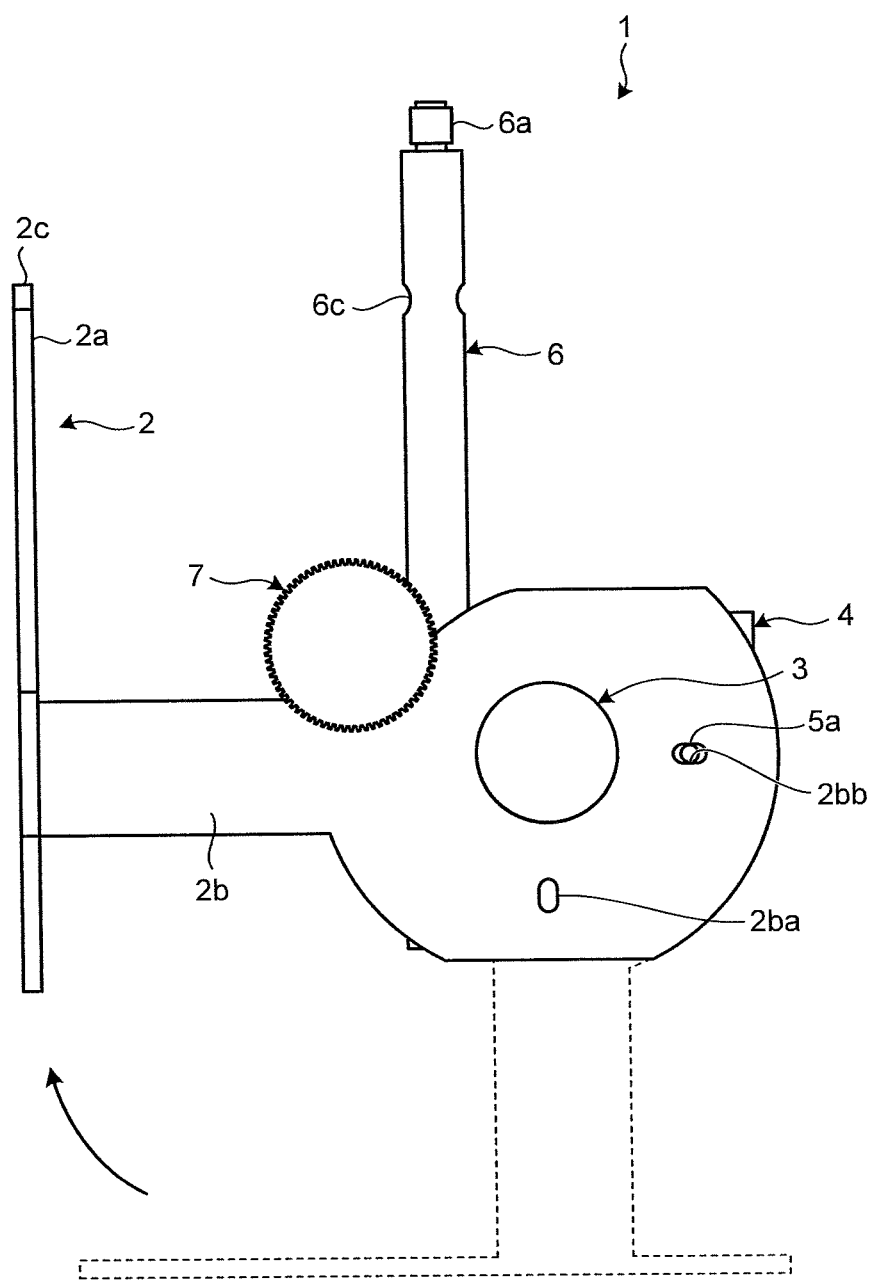
FIG. 6 is a schematic view when the light blocking plate is rotated in FIG. 3.

FIGS. 5 and 6 are schematic views when the light blocking plate is rotated in FIGS. 2 and 3, respectively. When the projection 2*c* of the light blocking plate 2 in the light blocking position is held and force in a direction along arrows in FIGS. 5 and 6 is applied thereto, the ball 5*a* of the ball plunger 5 escapes from the click groove 2*ba* of the light blocking plate 2 and the light blocking plate 2 rotates around the shaft 3. When the light blocking plate 2 rotates by 90 degrees, the ball 5*a* of the ball plunger 5 fits in the click groove 2*bb* of the light blocking plate 2. At that time, the light blocking unit 2*a* is located at a retracted position where the entire light blocking unit 2*a* is retracted away from an area in which the transmitting illumination light emitted from the second light source unit 104 passes. As a result, the transmitting illumination light is not blocked by the light blocking device 1 at the time of transmitting illumination observation.

As described above, the light blocking device 1 blocks all the direct light entering the objective lens 106 at the angle not larger than the aperture angle θ of the objective lens 106 when the light blocking unit 2*a* is arranged at the light blocking position. For example, it is not required to cover the entire specimen S in order to confirm cell fluorescent expression, and a sufficient effect can be obtained if ambient light entering the objective lens 106 from above the light blocking unit 2*a* is blocked. Since the light blocking device 1 does not cover the specimen S, operability is not lowered when exchanging or operating the specimen S, and visual observation of the specimen S is not prevented. The light blocking device 1 is attached to the second light source unit 104 of the microscope 100, so that this does not prevent motion of the mechanical stage on the stage 102. Furthermore, the light blocking device 1 does not block the transmitting illumination light emitted from the second light source unit 104 and does not prevent the transmitting illumination observation in the retracted position. Therefore, the light blocking device 1 is a light blocking device for an inverted microscope which blocks the ambient light without lowering the operability.

The light source 104*a* of the second light source unit 104 has the fluorescent body, so that there is a case in which the excitation light from the epifluorescence illumination optical system excites the fluorescent body of the white LED and the fluorescence becomes the ambient light. However, in the microscope 100, the light blocking device 1 blocks the excitation light from the epifluorescence illumination optical system, so that the ambient light caused by the light source 104*a* is not generated.

Since it is possible to block the transmitting illumination light by moving the light blocking unit 2*a* of the light blocking plate 2 from the retracted position to the light blocking position when switching from the transmitting illumination observation to epifluorescence observation by using the light blocking device 1, it is possible to switch an observation method without turning off the power of the second light source unit 104.

Modification

Figure 7:
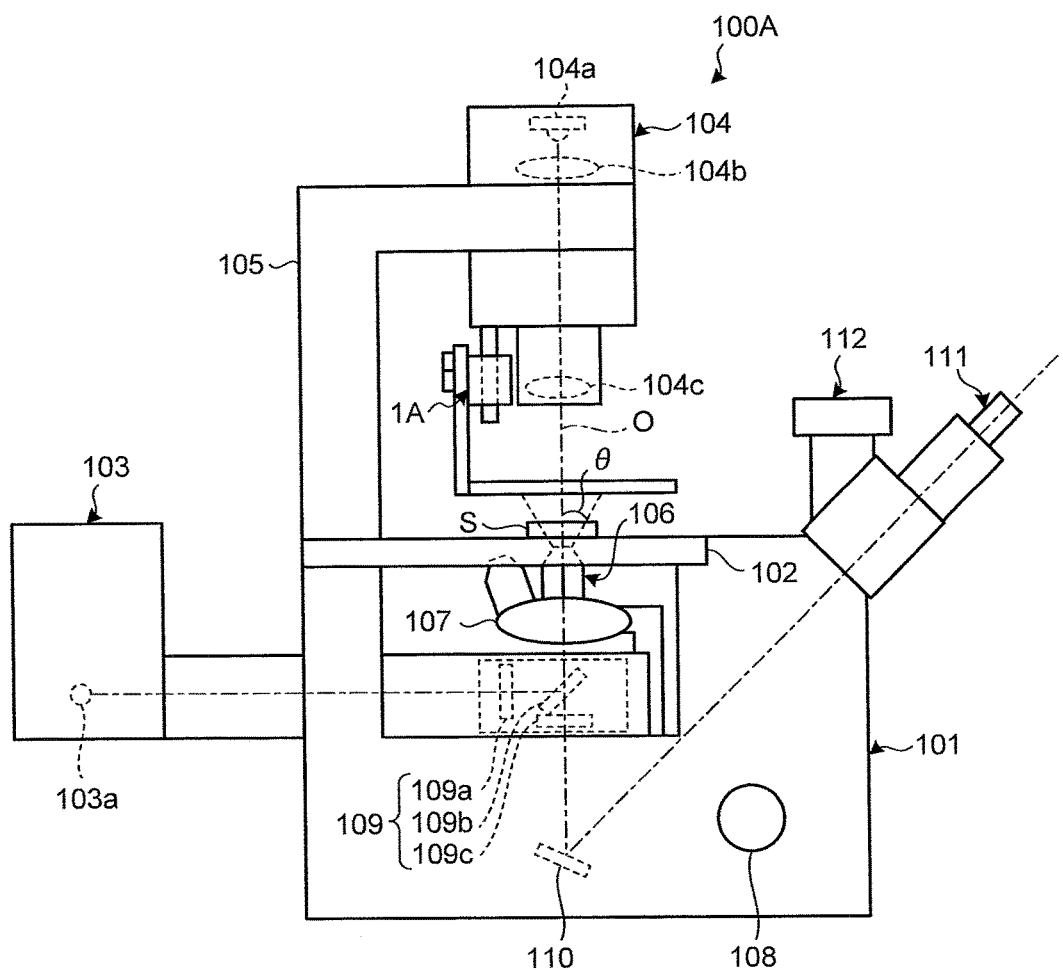
FIG. 7 is a schematic diagram illustrating a configuration of an inverted microscope according to modification of the first embodiment.

Next, reference will be made to a microscope 100A which is an inverted microscope according to a modification of a first embodiment. FIG. 7 is a schematic diagram illustrating a configuration of the inverted microscope according to the modification of the first embodiment. As illustrated in FIG. 7, in the microscope 100A, a configuration other than a light blocking device 1A is similar to that of the microscope 100 of the first embodiment, so that the description thereof will be omitted.

Figure 8:
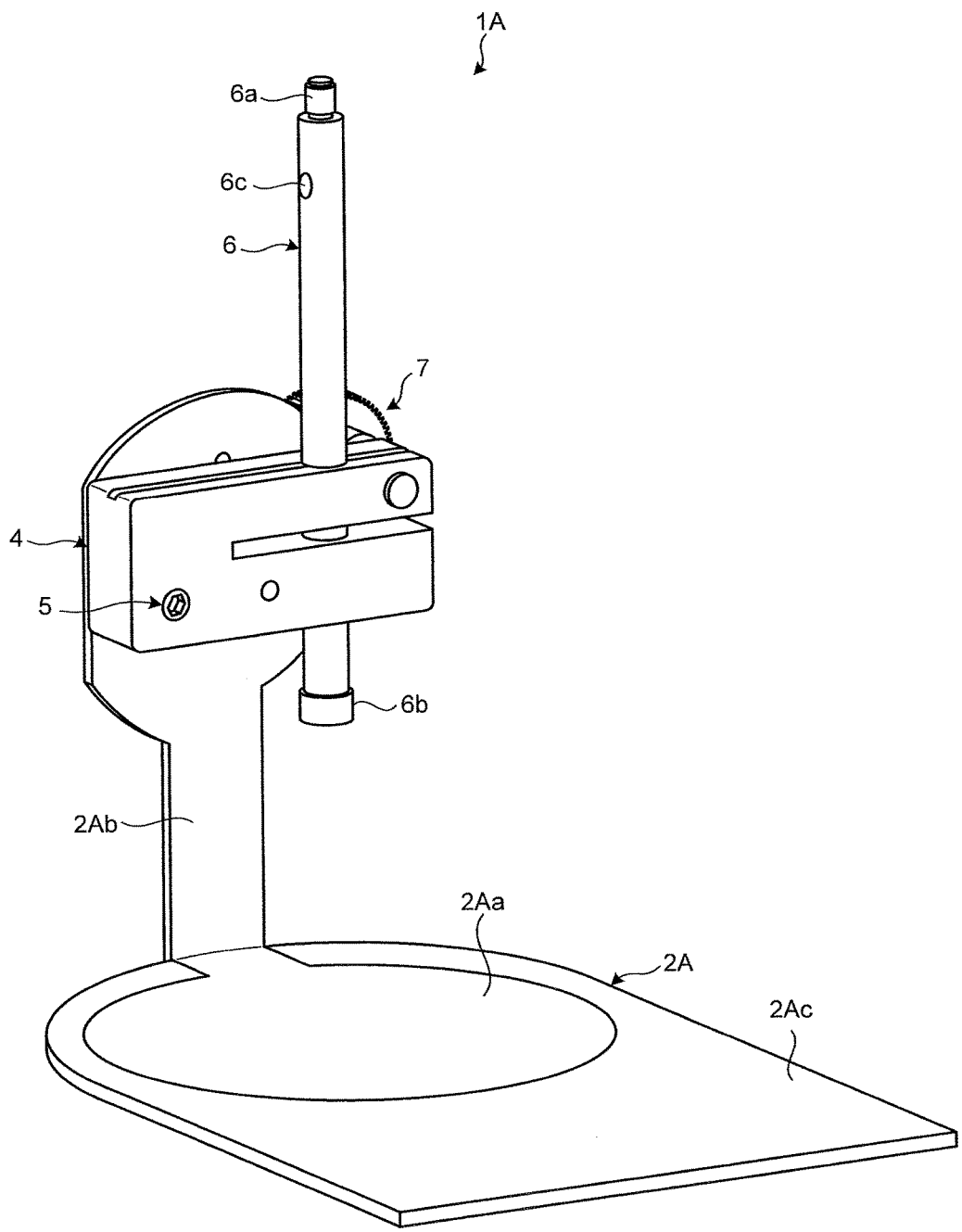
FIG. 8 is an enlarged view of a light blocking device illustrated in FIG. 7.

FIG. 8 is an enlarged view of the light blocking device illustrated in FIG. 7. As illustrated in FIG. 8, the light blocking device 1A has the configuration similar to that of the light blocking device 1 of the first embodiment except a light blocking plate 2A, so that the description is appropriately omitted.

The light blocking plate 2A includes a light blocking unit 2Aa, an arm unit 2Ab, and an antiglare plate 2Ac. The light blocking unit 2Aa can be arranged at a light blocking position so as to block all direct light entering an objective lens 106 at an angle not larger than an aperture angle θ of the objective lens 106. The arm unit 2Ab extends from a side of the light blocking unit 2a in a direction orthogonal to the light blocking unit 2a. The antiglare plate 2Ac is formed to be arranged on an outer periphery of the light blocking unit 2Aa so as to extend to a side of an observer; it is preferable that this has a function to block UV (ultraviolet) light and is formed of a translucent member for maintaining visibility of a specimen S. The antiglare plate 2Ac prevents UV scattered light from the specimen S from reaching an eye of the observer at the time of epifluorescence observation.

As described above, the microscope 100A according to the modification of the first embodiment is an inverted microscope which blocks ambient light without lowering operability.

Second Embodiment

Figure 9:
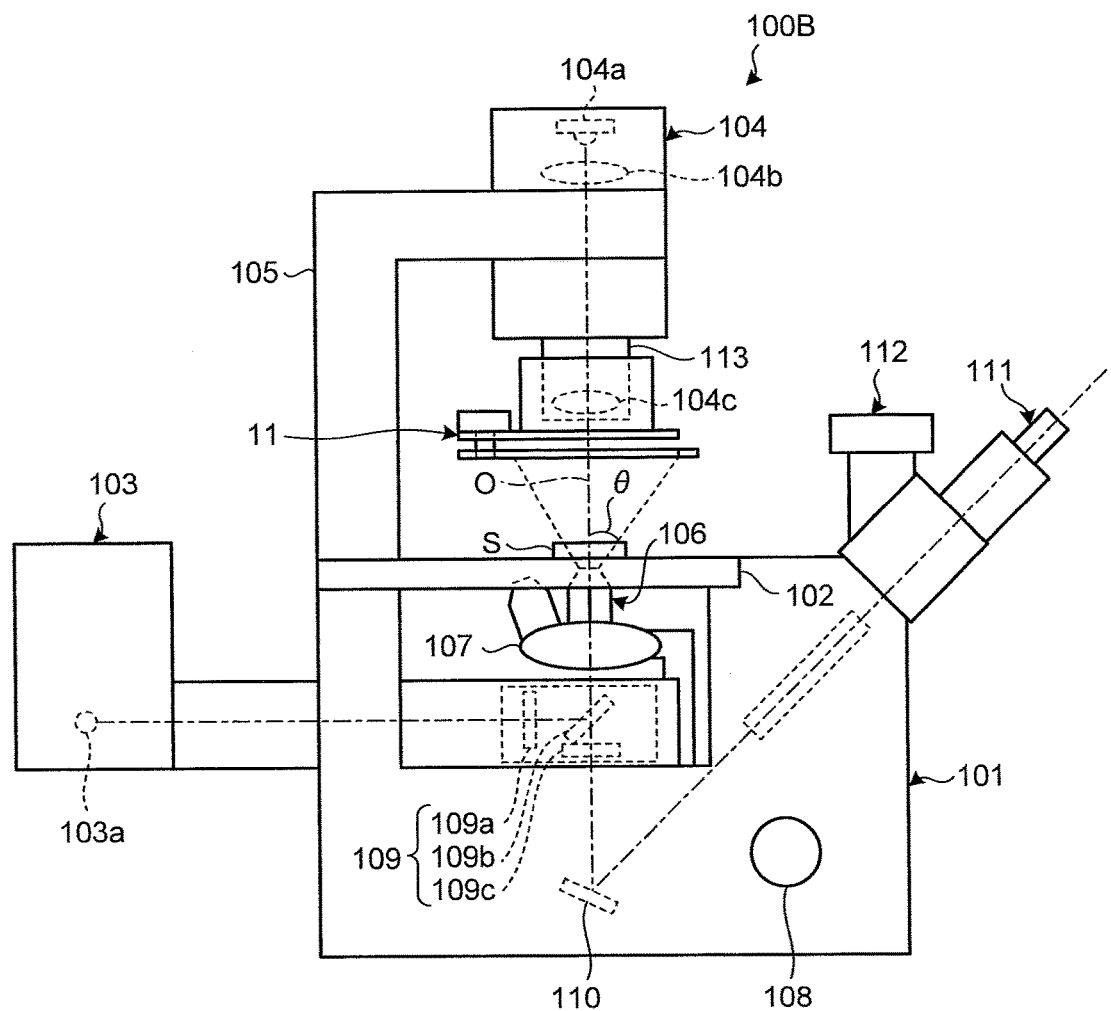
FIG. 9 is a schematic diagram illustrating a configuration of an inverted microscope according to a second embodiment of the present invention.

Next, reference will be made to a microscope 100B which is an inverted microscope according to a second embodiment of the present invention. FIG. 9 is a schematic diagram illustrating a configuration of the inverted microscope according to the second embodiment of the present invention. As illustrated in FIG. 9, in the microscope 100B, a configuration other than a light blocking device 11 and a holding unit 113 is similar to that of the microscope 100 of the first embodiment, so that the description is appropriately omitted. The light blocking device 11 is attached to the holding unit 113 connected to a lower portion of a second light source unit 104.

Figure 10:
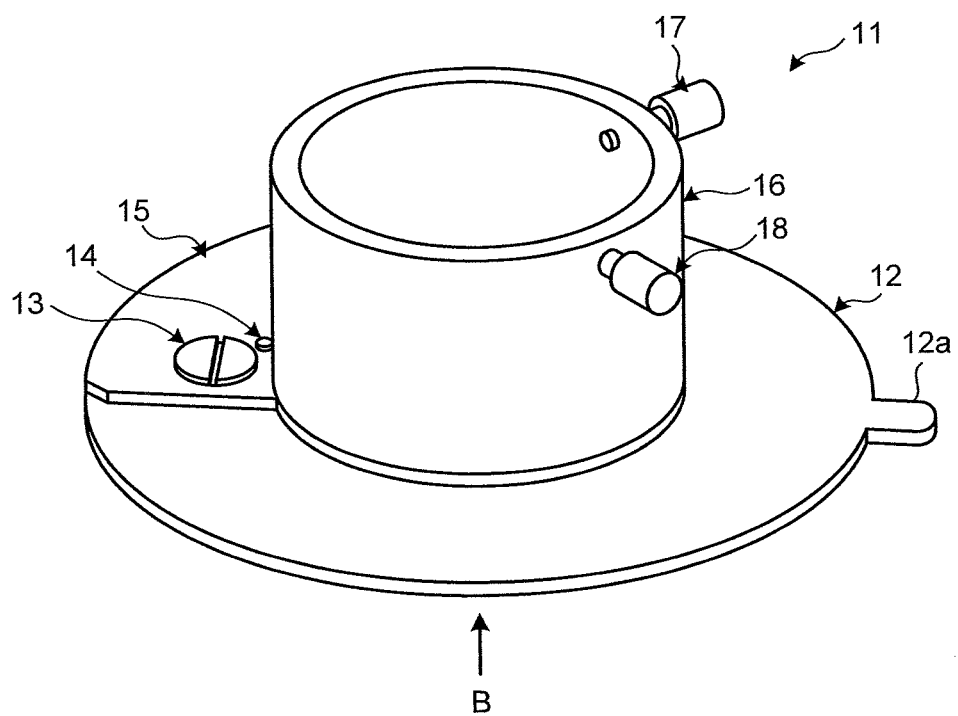
FIG. 10 is an enlarged view of a light blocking device illustrated in FIG. 9.
Figure 11:
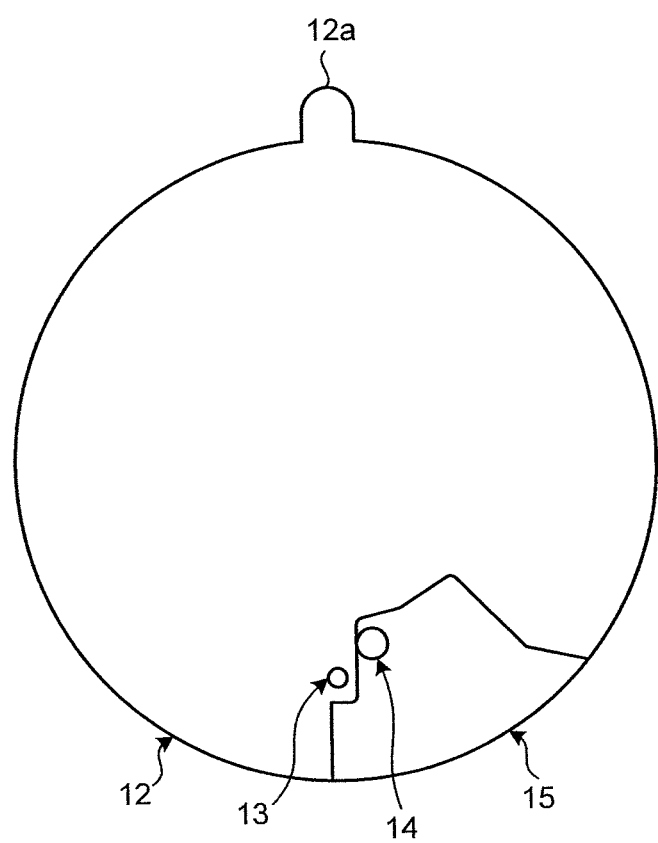
FIG. 11 is a schematic view taken in the direction of an arrow B in FIG. 10.

FIG. 10 is an enlarged view of the light blocking device illustrated in FIG. 9. FIG. 11 is a schematic view taken in the direction of an arrow B in FIG. 10. The light blocking device 11 is provided with a light blocking plate 12 arranged so as to be orthogonal to an observation optical axis O of the microscope 100B, a shaft 13 which holds the light blocking plate 12 so as to be rotatable, a stopper 14 which positions the light blocking plate 12, a plate 15 to which the shaft 13 is attached, a cylinder 16 to which the plate 15 is fixed, the cylinder 16 which can be fixed to the holding unit 113 of the microscope 100B, and knobs 17 and 18 which fix the cylinder 16 to the holding unit 113 of the microscope 100B.

The light blocking plate 12 having a disk shape on a part of which a notch is formed is arranged such that a principal surface of the disk is orthogonal to the observation optical axis O of the microscope 100B. The light blocking plate 12 includes a projection 12a which serves as a grip when locating the light blocking plate 12 on the observation optical axis O and deviating the light blocking plate 12 from the observation optical axis O, which will be described later.

The shaft 13 is attached to the plate 15 to hold the light blocking plate 12 so as to be rotatable. A weight (not illustrated) attached by insertion to an outer periphery of the shaft 13 to be arranged between the light blocking plate 12 and the plate 15 generates appropriate sliding force when the light blocking plate 12 is moved. The weight is formed of a disk spring and a resin washer, for example.

The stopper 14 abuts on the light blocking plate 12 as illustrated in FIG. 11 to regulate a movable range of the light blocking plate 12.

The plate 15 is fixed to the cylinder 16 to cover the notch on the light blocking plate 12 in a state illustrated in FIG. 11. The light blocking plate 12 and the plate 15 can be arranged, as a light blocking unit having a disk shape, at a light blocking position so as to block all direct light entering an objective lens 106 at an angle not larger than an aperture angle θ of the objective lens 106.

An inner diameter of the cylinder 16 is substantially the same as an outer diameter of the holding unit 113. The holding unit 113 is inserted into the cylinder 16.

The knobs 17 and 18 are screwed to screw holes formed on the cylinder 16 to fix the cylinder 16 to the holding unit 113 inserted into the cylinder 16. It is possible to change a position of the light blocking unit in a direction along the observation optical axis O of the microscope 100B by changing fixing positions of the knobs 17 and 18 to the holding unit 113. The light blocking unit blocks all the direct light entering the objective lens 106 at the angle not larger than the aperture angle θ of the objective lens 106 in at least a part of a range in which the light blocking unit can move.

Next, reference will be made to operation of retracting the light blocking plate 12 of the blocking device 11 from the observation optical axis O of the microscope 100B. First, in FIGS. 10 and 11, the light blocking plate 12 is located at the light blocking position to block all the direct light entering the objective lens 106 at the angle not larger than the aperture angle θ of the objective lens 106.

Figure 12:
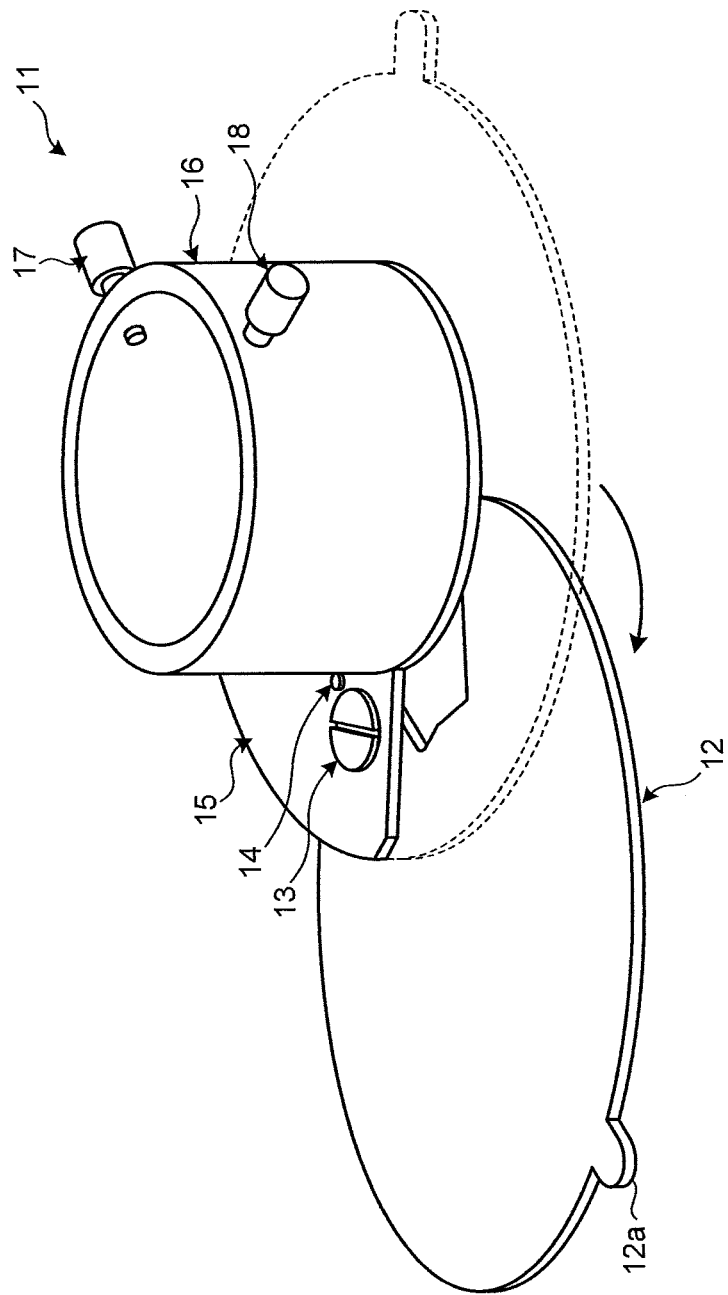
FIG. 12 is a schematic view when a light blocking plate is rotated in FIG. 10.
Figure 13:
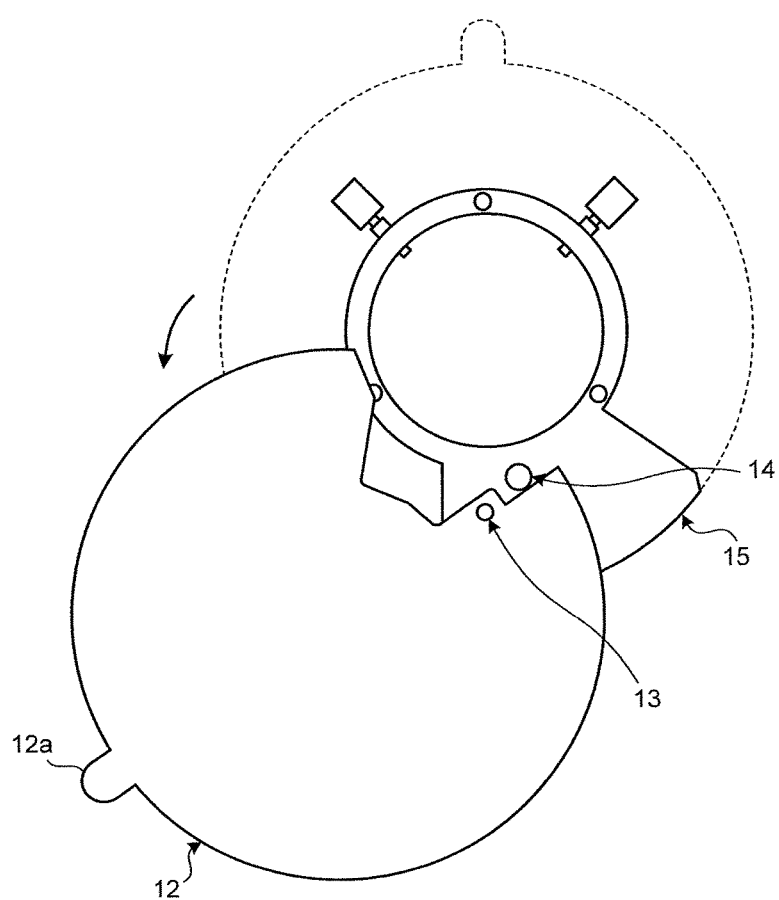
FIG. 13 is a schematic view when the light blocking plate is rotated in FIG. 11.

FIGS. 12 and 13 are schematic views when the light blocking plate is rotated in FIGS. 10 and 11, respectively. When the projection 12a of the light blocking plate 12 in the light blocking position is held and force in a direction along arrows in FIGS. 12 and 13 is applied thereto, the light blocking plate 12 rotates around the shaft 13. When the light blocking plate 12 rotates to the positions in FIGS. 12 and 13, the light blocking plate 12 abuts the stopper 14 and motion of the light blocking plate 12 is regulated. At that time, the light blocking plate 12 is at a retracted position where the entire light blocking plate 12 is retracted away from an area in which transmitting illumination light emitted from the second light source unit 104 passes.

As described above, in the light blocking device 11 in the microscope 100B according to the second embodiment, the light blocking plate 12 blocks all the direct light entering the objective lens 106 at the angle not larger than the aperture angle θ of the objective lens 106 when the light blocking plate 12 is located at the light blocking position. As a result, the light blocking plate 12 prevents generation of ambient light caused by a transmitting illumination optical system and prevents the ambient light other than this from entering the objective lens 106. Therefore, the microscope 100B is a light blocking device for an inverted microscope which blocks the ambient light without lowering operability.

According to some embodiments, it is possible to achieve an inverted microscope and a light blocking device for an inverted microscope for blocking ambient light without lowing the operability.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An inverted microscope comprising:
an epifluorescence illumination optical system configured to irradiate a specimen on a stage with epi-illumination light from below the stage;
a transmitting illumination optical system configured to irradiate the specimen on the stage with transmitting illumination light from above the stage;
an objective lens arranged below the stage and configured to collect the epi-illumination light on the specimen; and
a light blocking unit configured to be arranged between the stage and a lens of the transmitting illumination optical system through which the transmitting illumination light exits the transmitting illumination optical system, so as to be located on or deviated from an observation optical axis of the inverted microscope, and configured to be located at a light blocking position separated from the stage so as to block all direct light entering the objective lens at an angle not larger than an aperture angle of the objective lens, the direct light including the transmitting illumination light and light other than the transmitting illumination light.

2. The inverted microscope according to claim 1, wherein the light blocking unit is movable between the light blocking position and a retracted position, the retracted position being a position where the light blocking unit as a whole is retracted away from an area in which the transmitting illumination light emitted from the transmitting illumination optical system passes.

3. The inverted microscope according to claim 2, further comprising a positioning unit configured to position the light blocking unit at the light blocking position and configured to position the light blocking unit at the retracted position.

4. The inverted microscope according to claim 1, wherein
the light blocking unit is movable in a direction along the observation optical axis of the inverted microscope,
the inverted microscope further comprises a fixing unit configured to fix the light blocking unit within a range where the light blocking unit is movable, and
the light blocking unit is configured to be located at the light blocking position in at least part of the range where the light blocking unit is movable.

5. The inverted microscope according to claim 4, wherein the light blocking unit is configured to be fixed to the inverted microscope by the fixing unit in a detachable manner.

6. The inverted microscope according to claim 1, wherein the light blocking unit has a disk shape and is configured to be arranged such that a principal surface of the disk is orthogonal to the observation optical axis of the inverted microscope, and satisfies $$R \geq r + s \cdot \tan \theta$$

where R represents a radius of the light blocking unit, $\theta$ represents the aperture angle of the objective lens, r represents an aperture radius of the objective lens, and s represents a distance in a direction along the observation optical axis of the inverted microscope between the light blocking unit at the light blocking position and the objective lens.

7. The inverted microscope according to claim 1, wherein the transmitting illumination optical system includes a light source having a solid-state light emitting element for emitting excitation light and having a fluorescent body for emitting fluorescence by the excitation light emitted from the solid-state light emitting element.

8. The inverted microscope according to claim 7, wherein the light source is a white LED.

9. The inverted microscope according to claim 1, wherein the light blocking unit includes a projection which serves as a grip when locating the light blocking unit on the observation optical axis and deviating the light blocking unit from the observation optical axis.

10. A light blocking device for an inverted microscope, the light blocking device being configured to be attached to the inverted microscope, the inverted microscope comprising: an epifluorescence illumination optical system configured to irradiate a specimen on a stage with epi-illumination light from below the stage; a transmitting illumination optical system configured irradiate the specimen on the stage with transmitting illumination light from above the stage; and an objective lens arranged below the stage and configured to collect the epi-illumination light on the specimen, the light blocking device comprising:
a light blocking plate; and
a cylinder which is connected to the light blocking plate, wherein the cylinder includes a mounting portion which is mountable to a holding unit of the inverted microscope, the holding unit being connected to a lower portion of the transmitting illumination optical system,
wherein the light blocking plate is arranged such that, in a mounted state in which the mounting portion of the cylinder is mounted to the holding unit, the light blocking plate is configured to be arranged between the stage and a lens of the transmitting illumination optical system through which the transmitting illumination light exits the transmitting illumination optical system, so as to be located on or deviated from an observation optical axis of the inverted microscope, and configured to be located at a light blocking position separated from the stage so as to block all direct light entering the objective lens at an angle not larger than an aperture angle of the objective lens, the direct light including the transmitting illumination light and light other than the transmitting illumination light.

11. The light blocking device according to claim 10, wherein
the light blocking unit is movable between the light blocking position and a retracted position, the retracted position being a position where the light blocking unit as a whole is retracted away from an area in which the transmitting illumination light emitted from the transmitting illumination optical system passes, and
the light blocking device further comprises a positioning unit configured to position the light blocking unit at the light blocking position and configured to position the light blocking unit at the retracted position.

12. An inverted microscope comprising:
an epifluorescence illumination optical system configured to irradiate a specimen on a stage with epi-illumination light from below the stage;
a transmitting illumination optical system configured to irradiate the specimen on the stage with transmitting illumination light from above the stage, by a white LED having a fluorescent body;
an objective lens arranged below the stage and configured to collect the epi-illumination light on the specimen;
a light blocking unit that:
is configured to be arranged between the stage and a lens of the transmitting illumination optical system through which the transmitting illumination light exits the transmitting illumination optical system, so as to be located on or deviated from an observation optical axis of the inverted microscope;

has a plate-shaped principal surface and is configured to be arranged such that the principal surface is orthogonal to the observation optical axis of the inverted microscope; and is movable between a light blocking position and a retracted position, the light blocking position being separated from the stage, the light blocking unit being configured to block all direct light entering the objective lens at an angle not larger than an aperture angle of the objective lens when the light blocking unit is located at the light blocking position, the direct light including the transmitting illumination light and light other than the transmitting illumination light, and the retracted position being a position where the light blocking unit as a whole is retracted away from an area in which the transmitting illumination light emitted from the transmitting illumination optical system passes; and a positioning unit configured to position the light blocking unit at the light blocking position and configured to position the light blocking unit at the retracted position, wherein:

the inverted microscope satisfies $$R \geq r + s \cdot \tan \theta$$

where R represents a maximum distance between the observation optical axis and an end face of the blocking unit when the light blocking unit is located the light blocking position, $\theta$ represents the aperture angle of the objective lens, r represents an aperture radius of the objective lens, and s represents a distance in a direction along the observation optical axis of the inverted microscope between the light blocking unit at the light blocking position and the objective lens.

* * * * *